Dec. 4, 1934.  L. C. STUKENBORG  1,982,936
DUAL POST VEHICLE LIFT
Filed April 4, 1932   2 Sheets-Sheet 1
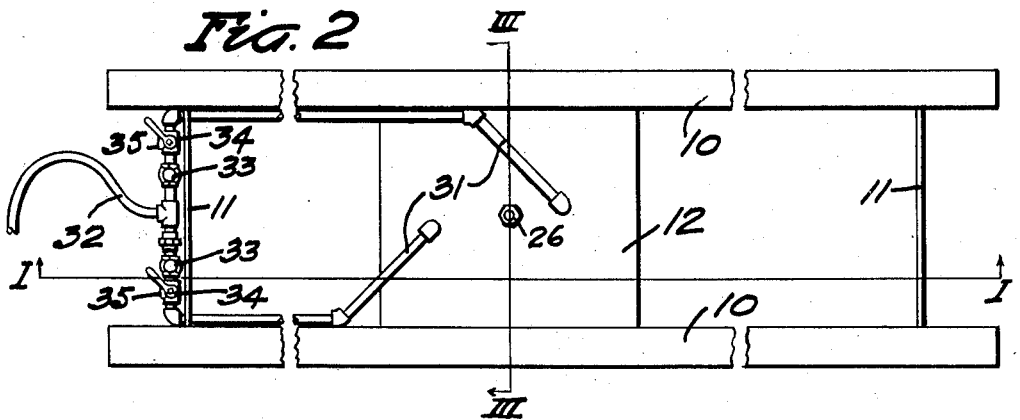
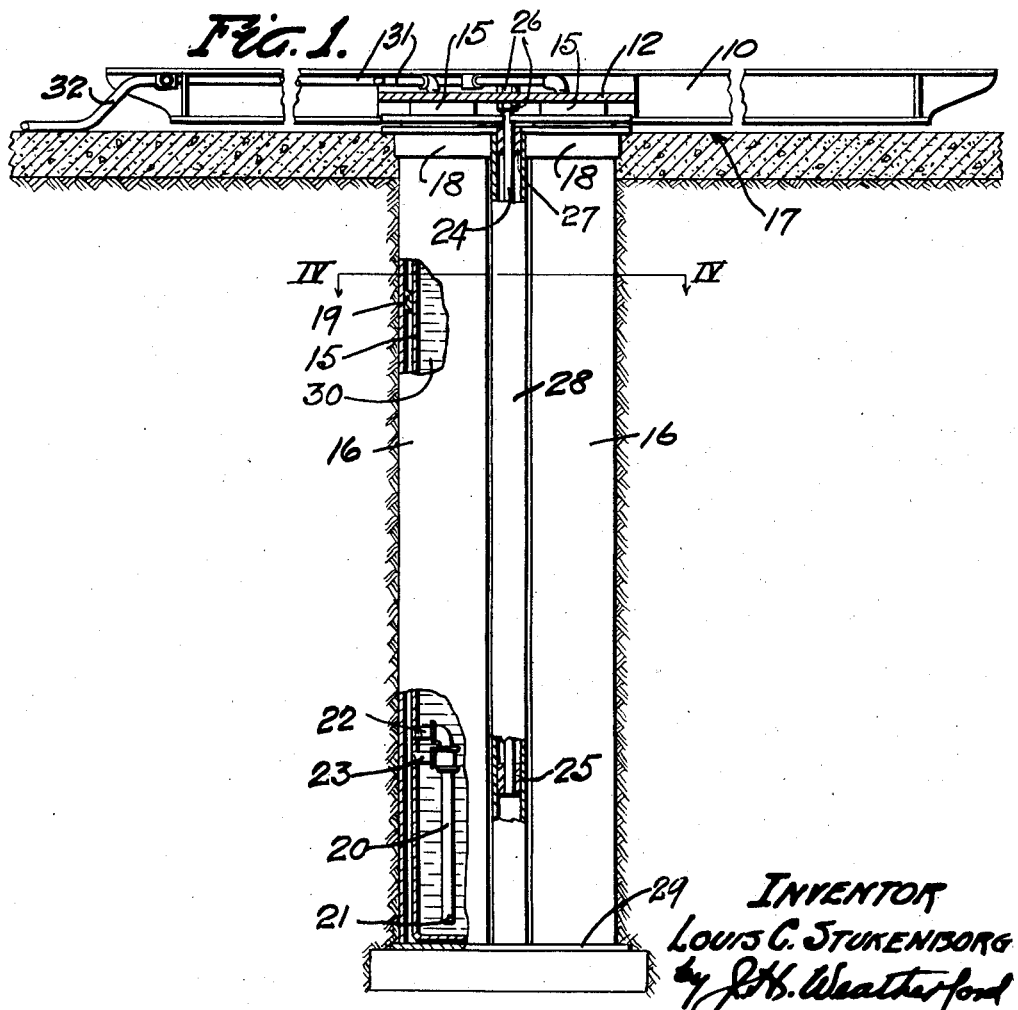
INVENTOR
LOUIS C. STUKENBORG
by J. H. Weatherford
ATTY.

Dec. 4, 1934.  L. C. STUKENBORG  1,982,936
DUAL POST VEHICLE LIFT
Filed April 4, 1932  2 Sheets-Sheet 2
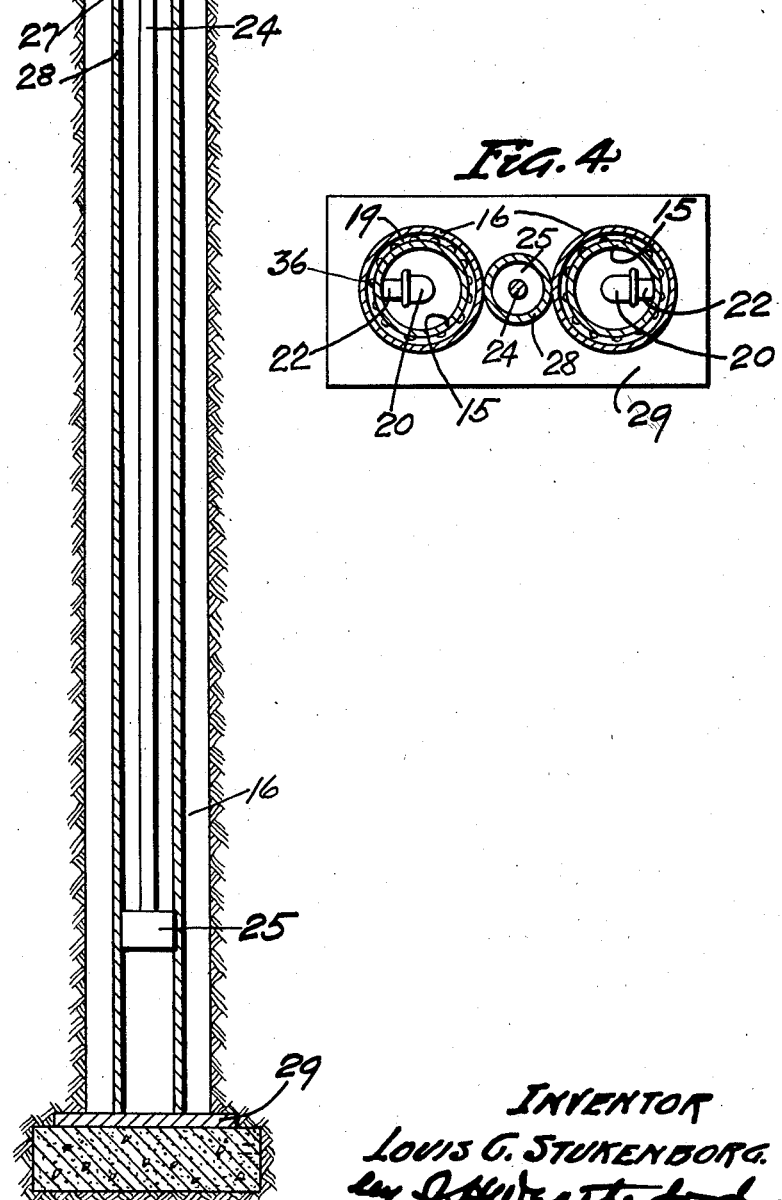

Patented Dec. 4, 1934

1,982,936

UNITED STATES PATENT OFFICE 1,982,936

DUAL-POST VEHICLE LIFT

Louis C. Stukenborg, Memphis, Tenn.

Application April 4, 1932, Serial No. 603,038

25 Claims. (Cl. 254—93)

This invention relates to vehicle lifts, more especially for raising automobiles for servicing, and is in part a continuation of my application for patent on Vehicle lifts, Serial No. 559,367 filed August 26, 1931 patented Dec. 26, 1933 as Patent No. 1,940,891.

Vehicle lifts for automobile servicing may be divided into two general types, namely, single and multiple post. In the single post type overturning due to unequal loading is resisted by such single post, which is often called upon to resist severe inequalities in loading, particularly those in longitudinal alignment with the supporting rails due to incorrect location of the automobile along the rails. In multiple post types a number of posts are employed which are more or less effective in overcoming this trouble except that there has been and still is great difficulty in coordinating the action of the separated posts, especially in the hydraulic types since there is great tendency for a lightly loaded plunger to raise faster than a heavy one, often with disastrous results.

The present device endeavors to correct these troubles first by the use of two cylinders which are placed close together and rigidly secured into a unitary structure, placing in these cylinders plungers which by virtue of their proximity may be, and are, rigidly connected together by a head for concurrent movement, second, by disposing a pair of elongated rails, forming the superstructure, symmetrically on opposite side of the plane through the axes of the two plungers and securing the rails directly to the head, thus making of the superstructure, the head and the plungers, a rigid unit which has its maximum stability in alignment with the maximum possible inequalities in loading.

The use of the two plungers also introduces a factor of safety, particularly in supporting a raised load. Many accidents have occurred from leakage, unforseen opening of a release valve, or breakage which have allowed a sudden drop of the carrying structure. This is obviated in part if not wholly by the provision of two cylinders, each of which may be independently released. While both cylinders are usually necessary to raise the load, one is usually sufficient to support the load when once raised.

Much difficulty has also been encountered in limiting the raise of the plungers, and various forms of stops or other devices have been used. These stops however where they are within the cylinders are inaccessible and have often rendered the construction and assembling of the parts extremely difficult. In the present structure endeavor has been made to obviate this and to so place and construct the limiting means as to render it accessible for assembling, disassembling, or repair.

The objects of my invention are:

To provide a lift which is simple and inexpensive in construction, and which provides for dual raising means available in part to balance the strains caused by unequal distribution of the load on the table;

To provide means which are available to support the load even though failure of one of the lifting means should occur;

To provide means for limiting the raise of the lift, and auxiliary means which will act in case of failure of the principal means; and To provide means for maintaining the longitudinal axis of the superstructure in alignment with the maximum stability of the lift.

The means by which the foregoing and other objects are accomplished and the manner of their accomplishment will readily be understood from the following specification, on reference to the accompanying drawings in which:—

Fig. 1 is a vertical sectional elevation taken as on the line I—I of Fig. 2;

Fig. 2 is a plan view;

Fig. 3 is a transverse vertical section taken as on the line III—III of Fig. 2; and Fig. 4 is a sectional plan taken as on the line IV—IV of Fig. 1; Figs. 3 and 4 being on a larger scale than Figs. 1 and 2.

Referring now to the drawings in which the various parts are indicated by numerals, 10—10 are a pair of side rails having their ends connected by braces 11. These rails are detachably secured to a head 12, which comprises a rectangular plate having side flanges 13 secured by welding thereto, thus forming a substantially I shaped member to which the rails are detachably secured as by bolts 14. Preferably the flanges 13 are of such width that they snugly fit between the flanges of the rails 10, and therefore when bolted into place, rigidly secure and align the rails.

The head 12 is disposed directly on the upper ends of a pair of plungers 15, to which plungers it is secured as by welding, the two plungers and the head thus forming a rigid unitary structure.

Each plunger is slidably mounted in a cylinder 16, which cylinders are vertically disposed and are ordinarily sunk below the ground level 17. Each of the cylinders is provided at its upper end with the usual stuffing box 18, which being well known and not in itself pertinent to the invention is not here detailed. Each of the cylinders is provided with a guide ring 19, disposed a substantial distance below the stuffing box, and which with such stuffing box forms the guiding means for its related plunger. Each of the plungers is closed at its lower end, and is provided adjacent such lower end with a vertically extending pipe 20, open at its lower end 21, and having at its upper end dual outlets 22, 23, which lead through a side wall of the plunger and form the support for the pipe; the purpose of the dual outlet being to provide uninterrupted communication from the interior of the plunger to the exterior thereof, particularly when one of these openings is partially or wholly closed by the guide ring 19.

The rise of the plungers is limited by a rod 24, which has a stop 25 on its lower end, and is secured at its upper end to the head 12 as by nuts 26. The rod 24 is slidably mounted through an upper block 27, with which the stop 25 contacts when the plungers have reached the upper desired limit of travel. Preferably the rod 24, the stop 25 and the block 27, are housed in an auxiliary casing 28, which forms also a guide for the stop 25. The two cylinders 16 rest on a plate 29, to which they are both welded, this plate forming the lower head for the two cylinders and rigidly connecting them together. Preferably the auxiliary casing 28 is also connected to this plate as by welding.

The plungers are filled with liquid 30 which is forced therefrom by air pressure supplied through pipes 31, which lead each to one of the plungers. Air is jointly supplied through these pipes, from a source of supply not shown, through a flexible hose 32 which is jointly connected to them. 33 are check valves preventing return flow to the hose 32, and 34 are three way valves which may be turned to allow direct flow through the pipes 31 to the plungers or be turned to release the pressure through openings 35 into the atmosphere to let the plungers descend.

It will be particularly noted that the positioning of the upper outlets 22 with relation to the stop 25 is such that the stop 25 contacts with the block 27 before the outlets 22 reach the top of the packing in the stuffing box 18, so that upward movement of the plungers is limited by the stop 25. Should however the stop fail to limit this movement, through breakage of the parts or for any other reason, the outlets 22 would pass above the packing and discharge from the ends of the cylinders, thus limiting such upward movement before the plungers are forced from the cylinders and disaster occurs.

The cylinders 16 are set up on the plate 29 a sufficient distance apart to permit the placing of the auxiliary casing 28 there between and are carefully aligned with their axes exactly parallel. They are temporarily held in such alignment and their lower ends welded to the plate 29. The auxiliary casing 28 is placed between them and is welded at the lower end to the plate 29 being spaced at such end equidistant from the cylinders. At the upper end this casing preferably touches both stuffing boxes and is welded thereto or suitable filling blocks (not shown) may be used where greater spacing of the cylinders occurs and these be welded directly to the cylinders and the casing. In any event, the cylinders are not only secured together at their lower ends, but they are also rigidly secured together at their upper ends, forming an integral unitary structure.

The plungers 15 are placed in these cylinders and while held in alignment in the cylinders are welded to the plate 12, which forms a head for them and rigidly secures them together for concurrent action. Preferably before placing the plate on the plungers and welding it thereto, the flanges 13 are welded to the plate with the upper and lower edges in accurate alignment, so that when the rails 10 are secured thereto these rails will be held with their upper surfaces in the same plane. In positioning the plate 12 on the pistons, it is laterally centered, with its longitudinal axis in alignment over the centers of the two pistons so that when the rails are secured to the head they are symmetrically disposed with relation to the line joining the centers of the two pistons, and are rigidly held in such relation, and thereby a more stable base is secured to resist unequal loading on the rails.

The structure above described may be shipped in separate units, one of which comprises the cylinder assembly including the limit bolt 24 and cooperating parts. This portion of the structure is set up in usual manner, by digging a pit in the ground, and placing and securing the cylinders in vertical position therein. The two pistons, and the head carried thereby, are then placed in the cylinders and the side rails 10 bolted in place. The plungers may then be filled with oil and the air pipes connected to them and also to a compressor or other source of air supply, and the device is ready for use.

In using the device, air is turned into the two plungers through the valves 35, thus establishing pressure on the liquid in the plungers and forcing this liquid upward through the pipes 20, and outward through the outlets 22 and 23, into the space between the plungers and the cylinders, forcing the plungers upward until such time as the air is shut off, or the stop 25 strikes the underside of the block 27 and limits further movement. Should the stop fail, through breakage or otherwise, the plungers would continue to rise until the outlets 22 pass the packing in the stuffing box 18 and discharge outside the cylinders, whereupon further rise would necessarily cease. Obviously, the latter limiting means could be used by itself, but the resulting overflow would not be tolerated in regular use.

It will of course be understood that fluid may be introduced into the cylinders by other means, than the air pressure shown, such means being well known, and that except where specifically noted I do not intend to limit myself to the means here shown for accomplishing the raise of the plunger.

It will further be understood that the rails are symmetrically disposed with respect to planes which would contain the axes of the two plungers, and are rigidly held in such position, so that any inequalities in loading due to faulty positioning of the load along the rails are directly in the line in which the spacing of the plungers gives the greatest stability of the device against overturning.

Having described my invention, what I claim is:

1. In a hydraulic jack, a cylinder, a hollow plunger slidably mounted therein and projecting therebeyond, said plunger having its lower end closed, and forming a reservoir for a liquid, a supply of liquid therein; and means for establishing discharge pressure on said liquid; a head secured on said plunger, means carried by said head and cooperative means carried by said cylinder both exterior to said cylinder for limiting movement of said plunger, a discharge pipe disposed in said plunger, said pipe having its lower end open and disposed adjacent the lower end of said plunger, extending upward therefrom and laterally through a side wall of said plunger to allow discharge through said wall, said discharge point being so positioned in said plunger as to lie adjacent, but below the top of said cylinder when said limit of plunger movement is reached, whereby failure of said limiting action will allow said discharge point to move beyond said cylinder top and limit further movement.

2. In a hydraulic jack, a cylinder, a hollow plunger slidably mounted therein and projecting therebeyond, a guide ring within said cylinder and spaced from the top thereof; said plunger having its lower end closed and forming a reservoir for a liquid, a supply of liquid therein, and means for establishing discharge pressure on said liquid, a vertically disposed discharge pipe within said plunger, said pipe having its lower end open and adjacent the lower end of said plunger, and a pair of discharge pipes leading laterally from said pipe, adjacent the upper end thereof, through a side wall of said plunger, said discharge pipes being spaced apart a distance greater than the width of said guide ring whereby one of said discharge pipes is effective while said pipes are passing said ring and the upper of said pipes limits movement of said plunger from said cylinder.

3. In a hydraulic jack, a cylinder, a hollow plunger slidably mounted therein and projecting therebeyond, a guide ring within said cylinder and spaced from the top thereof, said plunger having its lower end closed, and forming a reservoir for a liquid, a supply of liquid therein, and means for establishing discharge pressure on said liquid, a vertically disposed passageway open at its bottom end, within said plunger, and a pair of discharge passageways leading from said first passageway adjacent its upper end, through a side wall above the bottom of said plunger, said discharge passageways being spaced apart a distance greater than the width of said guide ring, whereby one of said discharge passageways is open when said passageways are passing said ring, and the upper of said passageways is effective to limit movement of said plunger from said cylinder.

4. In a hydraulic jack, a cylinder, a hollow plunger slidably mounted therein and projecting therebeyond, said plunger having its lower end closed forming a reservoir for a liquid, a supply of liquid therein, and means for establishing discharge pressure on said liquid; a discharge pipe having its lower end open, disposed within the plunger, with said end adjacent the lower end thereof, said pipe extending upwardly and laterally through a side wall of said plunger to allow discharge through said wall.

5. In a hydraulic jack, a cylinder, a hollow plunger slidably mounted therein and projecting therebeyond, said plunger having its lower end closed forming a reservoir for a liquid, a supply of liquid therein, and means for establishing discharge pressure on said liquid; a discharge passageway having its lower end open, and within the plunger, with said end adjacent the lower end thereof, said pipe extending upwardly and laterally through a side wall of said plunger to allow discharge through said wall into said cylinder.

6. In a lift device, a cylinder, a tubular plunger therein having a closed bottom and constituting a reservoir for lifting liquid, packing at the upper end of said cylinder surrounding said plunger, means for discharging air under pressure into said plunger for thereby displacing the lifting liquid therefrom, said plunger having an opening through which said lifting liquid is discharged into said cylinder when so displaced, said opening being spaced substantially above said bottom of said plunger whereby to be rendered ineffective for discharge into said cylinder, while a substantial part of the lower end of said plunger still remains in said cylinder, and a transfer pipe extending from said opening to a position adjacent said closed bottom of said plunger.

7. In a lift device, a cylinder, a tubular plunger therein having a closed bottom and constituting a reservoir for lifting liquid, packing at the upper end of said cylinder surrounding said plunger, means for discharging air under pressure into said plunger for thereby displacing the lifting liquid therefrom, mechanical stop means for said plunger, said plunger having an opening through which said lifting liquid is discharged into said cylinder when so displaced, said opening being spaced substantially above said bottom of said plunger, whereby to assume a position just below said packing when said mechanical stop means is operative and a safety position just above said packing with the lower end of said plunger still in said cylinder and the contents of the plunger being discharged to atmosphere through said opening without any possibility of further raising of the plunger.

8. In a hydraulic jack for subsurface use, a cylinder, a plunger slidably mounted therein and projecting therefrom, an auxiliary casing disposed along said cylinder and secured to the exterior thereof, as by welding, to accomplish an integral unit, an apertured block secured in the upper end of said casing, a head secured on said plunger and extending laterally therebeyond, a rod secured to said head, depending within said casing, and slidable disposed through said block, and a stop secured on said rod, cooperative with said block to limit movement of said plunger, said stop being housed in and protected by said casing.

9. In a hydraulic jack, a pair of adjacent cylinders, plungers slidably mounted, one in each thereof, and projecting therefrom, an apertured block disposed between the upper ends of said cylinder and rigidly secured to both thereof, a head rigidly secured to both of said plungers and compelling concurrent movement thereof, a rod secured to said head, depending along exterior to and substantially equidistant from said cylinders, said rod being slidably disposed through said block, and a stop secured on said rod and cooperative with said block to limit movement of the plungers and head assembly.

10. In a hydraulic jack for subsurface use, a pair of cylinders, plungers slidably mounted one in each thereof and projecting therefrom, an auxiliary casing disposed between said cylinders and integrally secured to both thereof, as by welding, to accomplish an integral unit, an apertured block secured in the upper end of said casing, a head rigidly secured to both of said plungers and compelling concurrent movement thereof, a rod secured to said head, depending within said casing, and slidably disposed through said block, and a stop secured on said rod and cooperative with said block to limit movement of said plungers whereby said movement-limiting means, limits lifting movement of both of said plungers, said stop being housed in and protected by said casing.

11. In a lift device, a pair of cylinders, disposed adjacent and in parallelism, plungers, one in each of said cylinders and extending thereabove, whereby each establishes with its cylinder a lift device having inherent lateral stability, a casing disposed between the proximate portions of said cylinders, means securing said cylinders and casing together into a rigid unit, a head rigidly connecting the extending ends of said plungers and compelling concurrence of movement thereof, a superstructure relatively much elongated with respect to said head, symmetrically disposed with respect thereto, and secured to and aligned therewith, whereby the maximum lateral stability of said structure is made available to said superstructure, an apertured stop secured in the upper end of said casing, and a bolt carried by said head, slidably disposed through said stop, said bolt having a head within said casing cooperating with said stop to limit upward movement of said head.

12. In a lift device, a pair of cylinders disposed adjacent and in parallelism, a casing disposed between the proximate portions of said cylinders, means securing said cylinders and casing together into a rigid unit, a pair of plungers, one in each of said cylinders and projecting thereabove, a superstructure carried by said plungers, an apertured stop secured at the upper end of said casing, a bolt secured to and depending from said superstructure, through said apertured stop into said casing, said bolt having a head thereon below said stop and adapted to cooperate therewith to limit upward movement of said superstructure.

13. In a lift device, a base plate, a pair of cylinders adjacent and in parallelism, and an interposed casing all seated on and secured to said plate as by welding, means securing the upper ends of said cylinders rigidly to said casing, plungers, one in each of said cylinders and projecting thereabove, a superstructure carried by said plungers, an apertured stop secured at the upper end of said casing, a bolt secured to said superstructure and depending through said aperture into said casing, said bolt carrying means within said casing, below and complementary to said stop, for limiting upward movement of said superstructure.

14. In a device of the character described, a pair of cylinders adjacent and secured together in parallelism, a pair of plungers, disposed one in each of said cylinders, a head laterally symmetrical with respect to the plane of the plunger axes, integrally secured to the upper ends of both of said plungers, and compelling concurrent movement thereof, a pair of rails fixedly secured to opposite sides of said head and extending substantially equal distance from both ends of said head, the major portion of said rails overhanging said head, said rails being symmetrically disposed on opposite sides of said plane, and means for establishing fluid pressure in and releasing same from said cylinders to raise and lower said plungers.

15. In a device of the character described, cylinders adjacent and integrally secured together in parallelism, plungers, disposed one in each of said cylinders, and projecting therefrom, means compelling concurrent movement of said plungers, a pair of elongated rails symmetrically disposed with respect to a plane through the axes of said plungers and extending substantially equal distances therefrom, with the major portion of said rails overhanging, said rails being fixedly secured to and held in such alignment by said plungers, and means for establishing fluid pressure in, and releasing same from, said cylinders to raise and lower said plungers.

16. In a device of the character described, a pair of cylinders adjacent and secured together in parallelism, a pair of plungers disposed one in each of said cylinders, a head mounted on and rigidly secured to the upper ends of both of said plungers to compel concurrence of movement of said plungers, a superstructure for the engagement and support of an automobile or the like, rigidly secured to said head, and means for establishing fluid pressure in, and independently releasing same from, each of said cylinders, whereby either of said plungers may be effective, independently of the other, for supporting the total load.

17. In a device of the character described, cylinders adjacent and secured together in parallelism, plungers, disposed one in each of said cylinders, a superstructure for the engagement and support of an automobile or the like, rigidly secured to said plungers and compelling concurrent movement thereof, means for establishing fluid pressure in said cylinders, means for holding said pressures in each of said cylinders independently, whereby each of said plungers, independently of the other, is effective for supporting the total load, and means for releasing said pressures.

18. In a hydraulic jack having a pair of adjacent, vertically-disposed cylinders rigidly secured together and a plunger in each thereof, said plungers being constrained to move concurrently by rigid connection therebetween, and elongated supporting means, laterally symmetrical with respect to the plane of the plunger axes, rigidly secured to and overhanging said plungers substantially equal amounts in opposite directions.

19. In a vehicle lift, the combination, with a pair of adjacent vertically disposed cylinders rigidly secured in parallelism, each cylinder having a plunger therein, and a head disposed in predetermined relation to said plungers, and maintained in said relation by rigid connection between said head and said plungers, said head compelling concurrent movement of said plungers, of means rigidly carried by said head for supporting an elongated object, said means being laterally symmetrical with respect to the plane through the plunger axes.

20. In a vehicle lift, the combination, with a pair of adjacent vertically disposed cylinders, each having a plunger therein and projecting therefrom, of a member connecting the projected ends of said plungers and compelling concurrence of movement thereof, by rigid connection therebetween, elongated means for supporting a vehicle at a plurality of points along its major axis, the major portion of said means overhanging said member and projecting substantially equal amounts, said means being fixedly secured to said member and being laterally symmetrical with the plane through the plunger axes.

21. In a vehicle lift, the combination, with a pair of adjacent vertically-disposed cylinders, each having a plunger therein, of a member connecting the upper ends of said plungers and compelling concurrence of movement thereof, by unyielding connection therebetween, vehicle supporting means of relatively much greater length than said member, disposed symmetrically with respect to the plane through the longitudinal axes of said plungers, said means overhanging said member substantially equal amounts and being rigidly secured to said member whereby said supporting means is at all times retained with its major axis substantially in the plane of the plunger axes.

22. In a lift device, a pair of adjoining vertical cylinders, rigidly supported, plungers one in each of said cylinders and extending thereabove, means rigidly connecting the extending ends of said plungers and compelling concurrence of movement thereof, and a superstructure greatly elongated relative to said connecting means fixedly secured thereto, substantially in alignment therewith, said superstructure extending beyond said cylinders, whereby a stable structure is established for an elongated object.

23. In a lift device, a plurality of proximate vertical cylinders, rigidly supported, plungers, one in each of said cylinders and extending thereabove, means rigidly connecting the extending ends of said plungers and compelling concurrence of movement thereof, and an elongated superstructure fixedly secured to said connecting means, substantially symmetrical with respect to the plane containing the axes of said plungers, the major portion of said superstructure extending outward beyond said cylinders, whereby a stable structure is established for an elongated object.

24. In a lift device, a pair of cylinders, disposed adjacent and in parallelism, plungers, one in each of said cylinders and extending thereabove, and an intermediate member substantially contacting with the proximate portions of said cylinders, said cylinders and intermediate member being secured together into a rigid unit, means rigidly connecting the extending ends of said plungers and compelling concurrence of movement thereof, and a superstructure relatively much elongated with respect to said connecting means symmetrically disposed with respect thereto fixedly secured to and aligned therewith, whereby the maximum lateral stability of said structure is made available to said superstructure.

25. In a lift device, a pair of cylinders, disposed adjacent and in parallelism, plungers, one in each of said cylinders and extending thereabove, an intermediate casing lying between and adjacent the proximate portions of said cylinders, means rigidly securing said cylinders and casing together into a rigid unit, means rigidly connecting the extending ends of said plungers and compelling concurrence of movement thereof, and a superstructure relatively much elongated with respect to said connecting means, symmetrically disposed with respect thereto, and fixedly secured to and aligned therewith, whereby the maximum lateral stability of said structure is made available to said superstructure.

LOUIS C. STUKENBORG.